US010704658B2

(12) United States Patent
Chen

(10) Patent No.: US 10,704,658 B2
(45) Date of Patent: Jul. 7, 2020

(54) RESISTANCE ADJUSTING DEVICE FOR NON-PULL CORD WINDOW BLIND

(71) Applicant: Po-Yu Chen, Taichung (TW)

(72) Inventor: Po-Yu Chen, Taichung (TW)

( * ) Notice: Subject to any disclaimer, the term of this patent is extended or adjusted under 35 U.S.C. 154(b) by 217 days.

(21) Appl. No.: 15/892,641

(22) Filed: Feb. 9, 2018

(65) Prior Publication Data

US 2019/0162278 A1 May 30, 2019

(30) Foreign Application Priority Data

Nov. 28, 2017 (TW) .............................. 106141422 A

(51) Int. Cl.
*E06B 9/322* (2006.01)
*F16H 19/06* (2006.01)

(52) U.S. Cl.
CPC ......... *F16H 19/0672* (2013.01); *E06B 9/322* (2013.01); *E06B 2009/3222* (2013.01)

(58) Field of Classification Search
CPC ............. E06B 9/322; E06B 2009/3222; E06B 2009/3225; E06B 9/324; E06B 9/38; Y10T 24/2187; Y10S 24/909; F16H 19/0672; A47H 3/00; A47H 3/02; A47H 3/08

See application file for complete search history.

(56) References Cited

U.S. PATENT DOCUMENTS

| 614,581 A | * | 11/1898 | Shown | ................... | A42B 3/145 |
| | | | | | 24/68 B |
| 973,034 A | * | 10/1910 | Graham | ................. | F16G 11/12 |
| | | | | | 242/388.2 |
| 2,080,233 A | * | 5/1937 | Schierghofer | .......... | E06B 9/324 |
| | | | | | 24/132 R |
| 2,661,514 A | * | 12/1953 | Martin | .................... | E06B 9/324 |
| | | | | | 24/134 KB |
| 2,710,998 A | * | 6/1955 | Meighan | ................. | B60P 7/083 |
| | | | | | 24/68 B |
| 2003/0192653 A1 | * | 10/2003 | Nien | ....................... | E06B 9/322 |
| | | | | | 160/168.1 R |
| 2015/0259976 A1 | * | 9/2015 | Hsueh-Cheng | ......... | E06B 9/326 |
| | | | | | 160/368.1 |
| 2016/0032645 A1 | * | 2/2016 | Wen | ........................ | E06B 9/324 |
| | | | | | 160/178.2 |
| 2018/0119490 A1 | * | 5/2018 | Chen | ....................... | E06B 9/322 |
| 2018/0313143 A1 | * | 11/2018 | Chang | .................... | E06B 9/322 |

(Continued)

*Primary Examiner* — Katherine W Mitchell
*Assistant Examiner* — Jeremy C Ramsey
(74) *Attorney, Agent, or Firm* — Rosenberg, Klein & Lee

(57) ABSTRACT

A resistance adjusting device for a non-pull cord window blind includes a base, a resistance adjusting seat, and a positioning pin. The base has a top hole, a pin hole, and a fixed shaft corresponding to the top hole. The resistance adjusting seat has a rotational shaft, and positioning holes and resistance adjusting rods arranged at intervals archedly relative to the rotational shaft. The resistance adjusting seat is rotatably sleeved onto the fixed shaft of the base by the rotational shaft, thereby able to adjust the friction resistance between the lift transmission cord and the resistance adjusting seat by one or a plurality of the resistance adjusting rods during rotation. The positioning pin is detachably disposed in the pin hole of the base and selectively inserted in one of the positioning holes of the resistance adjusting seat, to disable the resistance adjusting seat from rotating, thereby positioning it.

7 Claims, 6 Drawing Sheets

(56) References Cited

U.S. PATENT DOCUMENTS

| | | | |
|---|---|---|---|
| 2019/0162016 A1* | 5/2019 | Chen | B65H 79/00 |
| 2019/0316412 A1* | 10/2019 | Lei | E06B 9/322 |
| 2019/0323288 A1* | 10/2019 | Chen | E06B 9/322 |

* cited by examiner

RESISTANCE ADJUSTING DEVICE FOR NON-PULL CORD WINDOW BLIND

BACKGROUND OF THE INVENTION

1. Field of the Invention

The present invention relates to non-pull cord window blinds and more particularly, to a resistance adjusting device for the non-pull cord window blind.

2. Description of the Related Art

As to the general non-pull cord window blind, when the bottom beam is pulled downwardly, the lift transmission cord attached to the slats is pulled out by the bottom beam so as to escape from the cord rolling device gradually, until the slats are completely unfolded. In opposite, when the bottom beam is pushed upwardly, the upward pushing force applied to the bottom beam counteracts the weight of the bottom beam and all the slats, enabling the cord rolling device to roll up the lift transmission cord successfully, so that the slats can be folded up stably. However, no matter the bottom beam is in the process of being pulled downwardly or pushed upwardly by an external force, once the external force is relieved, the slats will not be easily fell down or folded up, but able to be stopped at any height at any time because of the appropriate resistance provided by a resistance device of the cord rolling device to the lift transmission cord.

For adapting to different usage requirements, the resistance provided by the resistance device to the lift transmission cord sometimes needs to be adjusted. However, in the aforesaid prior art, the user has to disassemble the whole cord rolling device before adjusts the resistance device and assemble the cord rolling device after the adjustment, that is very inconvenient in operation. Besides, many times of disassembly and assembly may affect the assembly accuracy of the inner members of the cord rolling device.

SUMMARY OF THE INVENTION

It is a primary objective of the present invention to provide a resistance adjusting device for the non-pull cord window blind, which is convenient in operation and needs no structural disassembly and assembly.

To attain the above objective, the present invention provides a resistance adjusting device which includes a base, a resistance adjusting seat, and a positioning pin. The base has a top hole, a pin hole located adjacent to the top hole, and a fixed shaft correspondingly located under the top hole and having circular cross-sections. The resistance adjusting seat has a rotational shaft, a driving portion, a plurality of positioning holes, and a plurality of resistance adjusting rods. The rotational shaft has an axial hole. The resistance adjusting seat is rotatably sleeved onto the fixed shaft of the base by the axial hole of the rotational shaft. The driving portion is disposed on a top end of the rotational shaft and accommodated in the top hole of the base. The plurality of positioning holes and the plurality of resistance adjusting rods are arranged at intervals and archedly center around a center of the axial hole of the rotational shaft. The positioning pin is detachably disposed in the pin hole of the base and selectively disposed in one of the positioning holes of the resistance adjusting seat, for positioning the resistance adjusting seat by disabling the resistance adjusting seat from rotating.

It can be understood from the above illustration that when the positioning pin is removed, a manual tool can be engaged with the driving portion of the resistance adjusting seat to rotate the resistance adjusting seat. At this time, the cord arrangement of the lift transmission cord can be changed by one or a plurality of the resistance adjusting rods during the rotation of the resistance adjusting seat, so that the friction resistance between the lift transmission cord and the resistance adjusting seat can be adjusted. After the adjustment is finished, the positioning pin is disposed back into the pin hole and the positioning hole to disable the resistance adjusting seat from rotating. As a result, the whole adjustment process of the resistance adjusting device of the invention needs no structural disassembly and assembly, thereby increasing the usage convenience and maintaining good assembly accuracy.

DETAILED DESCRIPTION OF THE INVENTION

Figure 1:
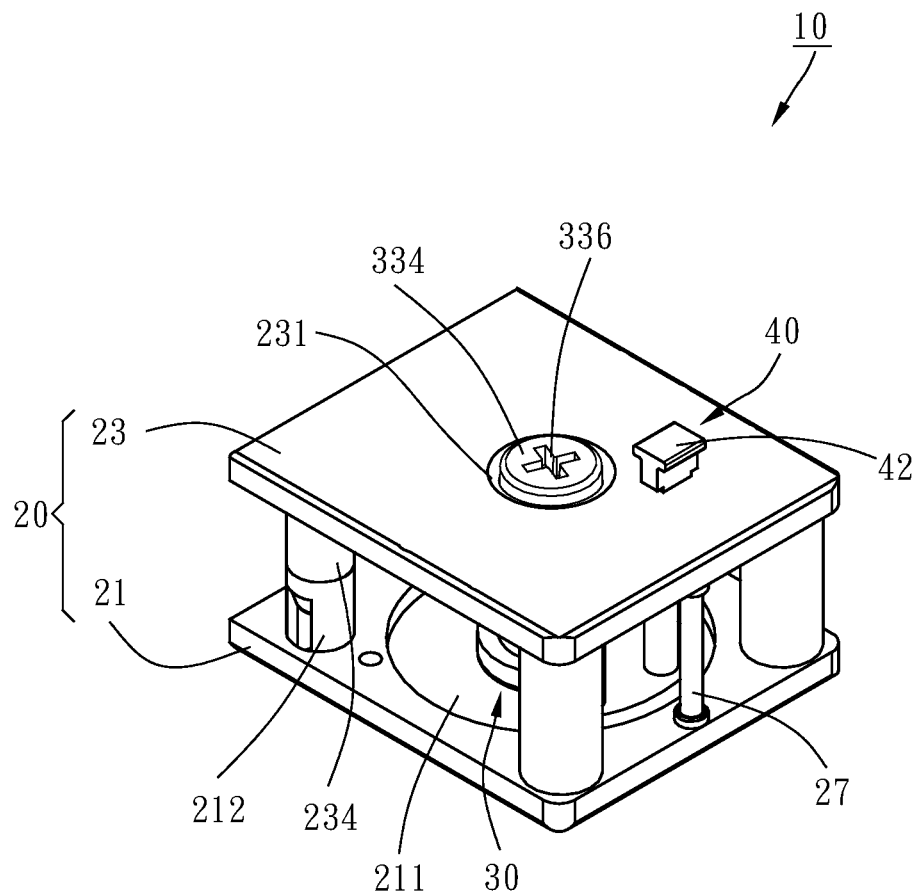
FIG. 1 is an assembled perspective view of a resistance adjusting device according to a first preferred embodiment of the present invention.
Figure 2:
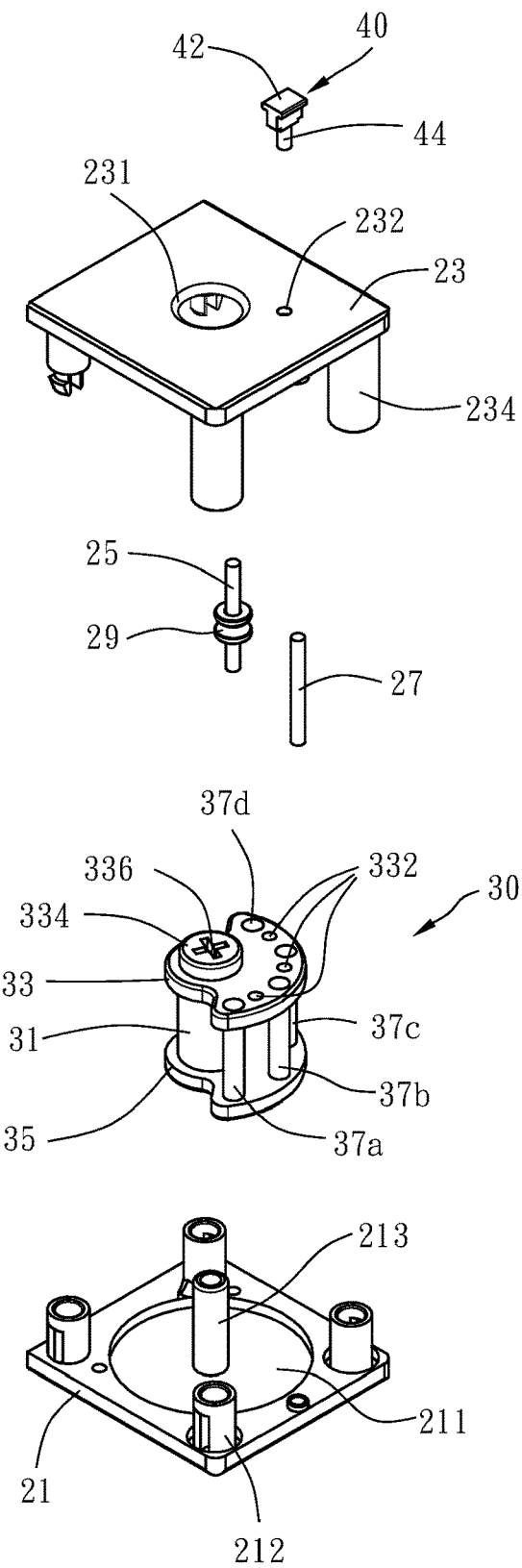
FIG. 2 is an exploded perspective view of the resistance adjusting device according to the first preferred embodiment of the present invention.

Referring to FIGS. 1-2, a resistance adjusting device 10 of the present invention includes a base 20, a resistance adjusting seat 30, and a positioning pin 40.

Figure 3:
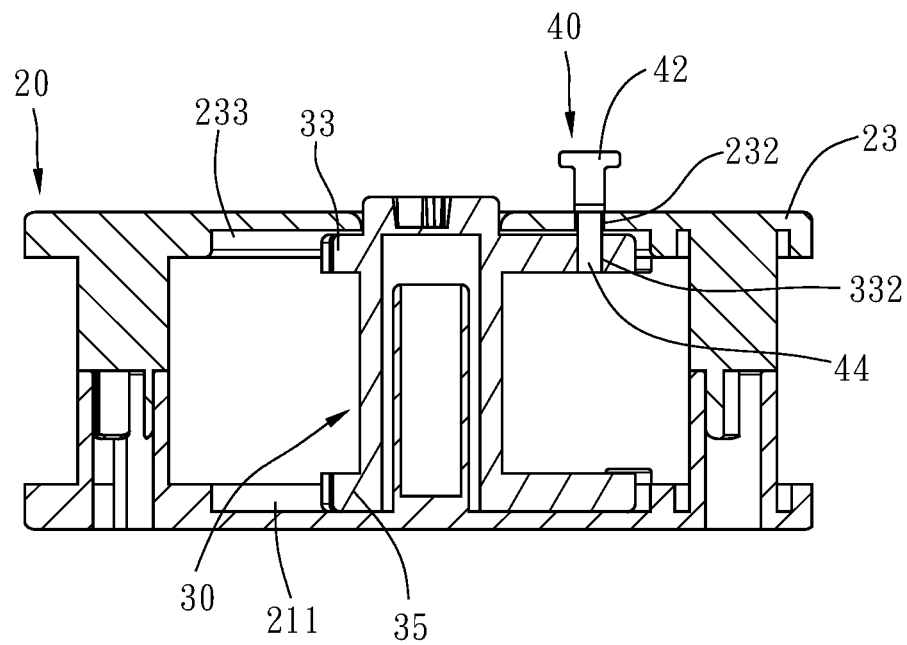
FIG. 3 is a sectional view of the resistance adjusting device according to the first preferred embodiment of the present invention, primarily showing the state before a positioning pin is removed.

The base 20 has a bottom plate 21 and a top plate 23. As shown in FIG. 2, the bottom plate 21 is provided on the top surface thereof with a bottom accommodating recess 211 and four bottom peripheral posts 212 located around the bottom accommodating recess 211. Besides, the bottom plate 21 is provided at the center thereof with a fixed shaft 213 located in the bottom accommodating recess 211 and having circular cross-sections. The top plate 23 has a top hole 231 located at the center thereof, and a pin hole 232 located adjacent to the top hole 231. As shown in FIGS. 2-3, the top plate 23 is provided on the bottom surface thereof with a top accommodating recess 233 and four top peripheral posts 234 located around the top accommodating recess 233. The top plate 23 and the bottom plate 21 are combined together by means of the top and bottom peripheral posts 234 and 212 corresponding one on one, so that the fixed shaft 213 of the bottom plate 21 is correspondingly located under the top hole 231 of the top plate 23. Besides, the base 20 is provided at two opposite ends thereof with a first tension guiding rod 25 and a second tension guiding rod 27 respectively. The first and second tension guiding rods 25 and 27 are connected between the top and bottom plates 23 and 21. There is a guiding wheel 29 sleeved onto the first tension guiding rod 25.

Figure 4:
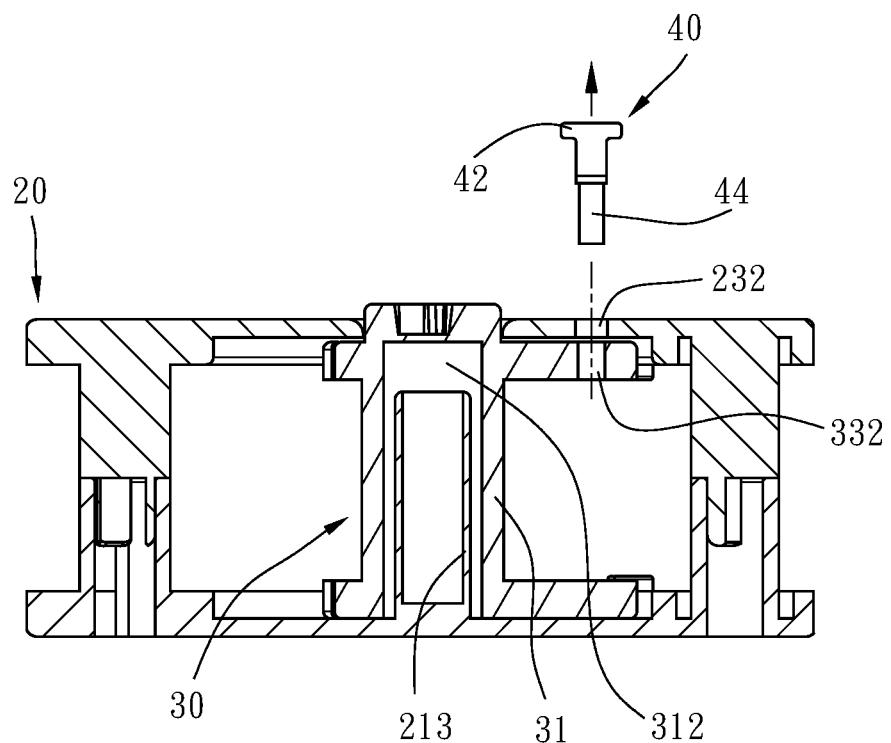
FIG. 4 is similar to FIG. 3, but primarily showing the state after the positioning pin is removed.
Figure 7:
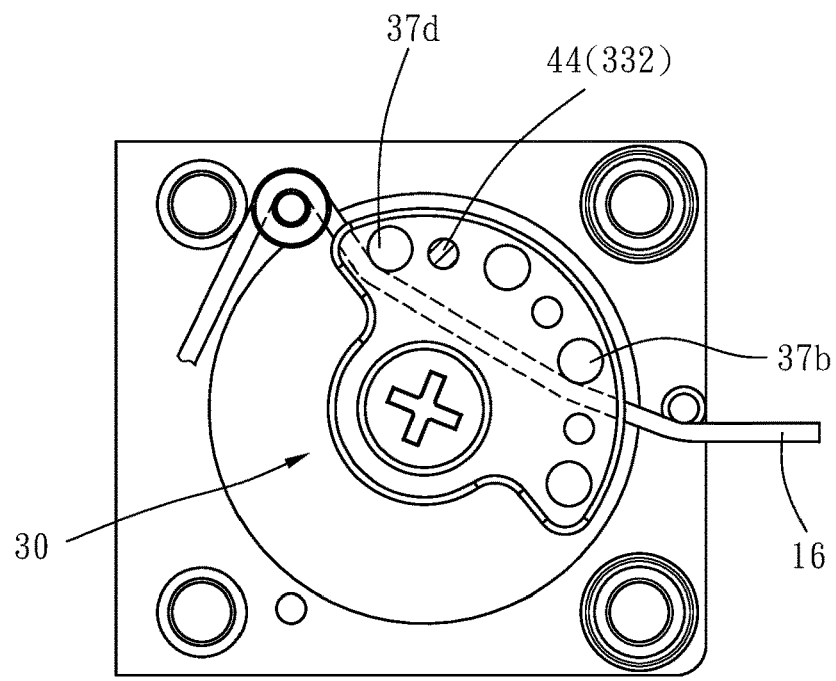
FIGS. 7-9 are sectional views of the resistance adjusting device according to the first preferred embodiment of the present invention, primarily showing the various cord arrangements of the lift transmission cord in the various states of the resistance adjusting seat.

As shown in FIGS. 2-3, the resistance adjusting seat 30 is disposed between the top and bottom plates 23 and 21 of the base 20, and has a rotational shaft 31, a top flank plate 33, a bottom flank plate 35 and four resistance adjusting rods 37a-37d. The rotational shaft 31 has an axial hole 312 which is circular in cross-sections, as shown in FIG. 4. The radius of the axial hole 312 is larger than the external radius of the fixed shaft 213 of the base 20, so that the resistance adjusting seat 30 is rotatable relative to the base 20 after being sleeved onto the fixed shaft 213 of the base 20 by means of the axial hole 312 of the rotational shaft 31. The top and bottom flank plates 33 and 35 are connected to the top and bottom ends of the rotational shaft 31 and rotatably accommodated in the top and bottom accommodating recesses 233 and 211 respectively. The top flank plate 33 has three positioning holes 332 and a driving portion 334. The positioning holes 332 are arranged at intervals and archedly center around the center of the axial hole 312 of the rotational shaft 31. The driving portion 334 is disposed on the top end of the rotational shaft 31 and accommodated in the top hole 231 of the base 20. In this embodiment, the driving portion 334 has a cross-shaped driving groove 336 for being engaged with a manual tool such as a cross-shaped screwdriver. As shown in FIGS. 2 and 7, the resistance adjusting rods 37a-37d are disposed between the top and bottom flank plates 33 and 35, arranged at intervals, and archedly center around the center of the axial hole 312 of the rotational shaft 31. Besides, the resistance adjusting rods 37a-37d and the positioning holes 332 are arranged in a staggered manner.

The positioning pin 40 has an operating portion 42 and a positioning portion 44 connected with the operating portion 42. As shown in FIG. 3, when the positioning portion 44 of the positioning pin 40 is inserted in one of the positioning holes 332 of the resistance adjusting seat 30 through the pin hole 232 of the base 20, the resistance adjusting seat 30 is disabled from rotating. At this time, the operating portion 42 of the positioning pin 40 is protruded from the top surface of the top plate 23 of the base 20. In opposite, as shown in FIG. 4, when the operating portion 42 of the positioning pin 40 is pulled up, the positioning portion 44 of the positioning pin 40 is separated from the positioning hole 332 where the positioning portion 44 is inserted formerly. Because the fixed shaft 213 of the base 20 and the axial hole 312 of the rotational shaft 31 of the resistance adjusting seat 30 are both circular in cross-sections, the resistance adjusting seat 30 at this time is rotatable relative to the base 20.

Figure 5:
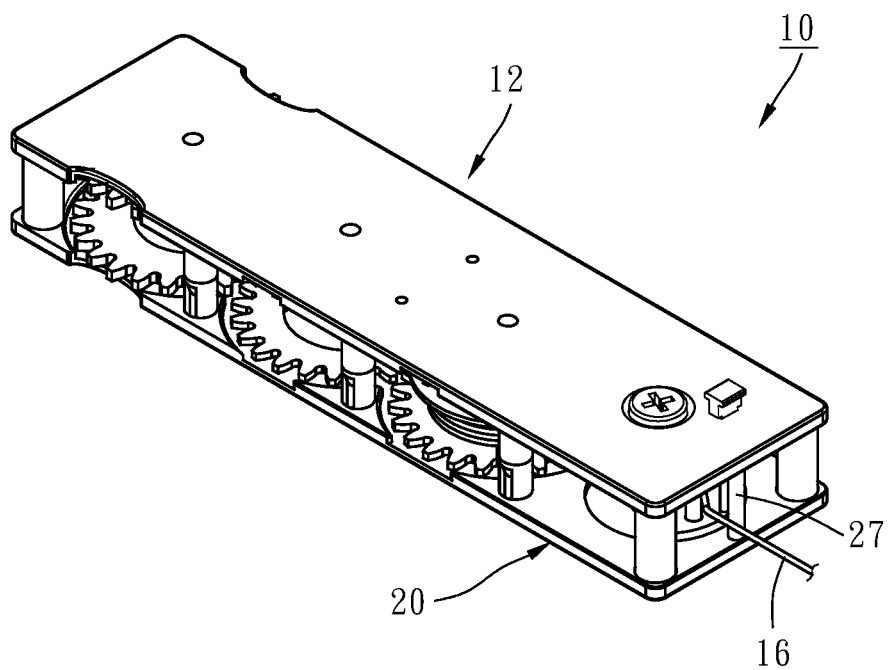
FIG. 5 is an assembled perspective view of the resistance adjusting device according to the first preferred embodiment of the present invention and a single-torsion-spring cord rolling device used with it.
Figure 6:
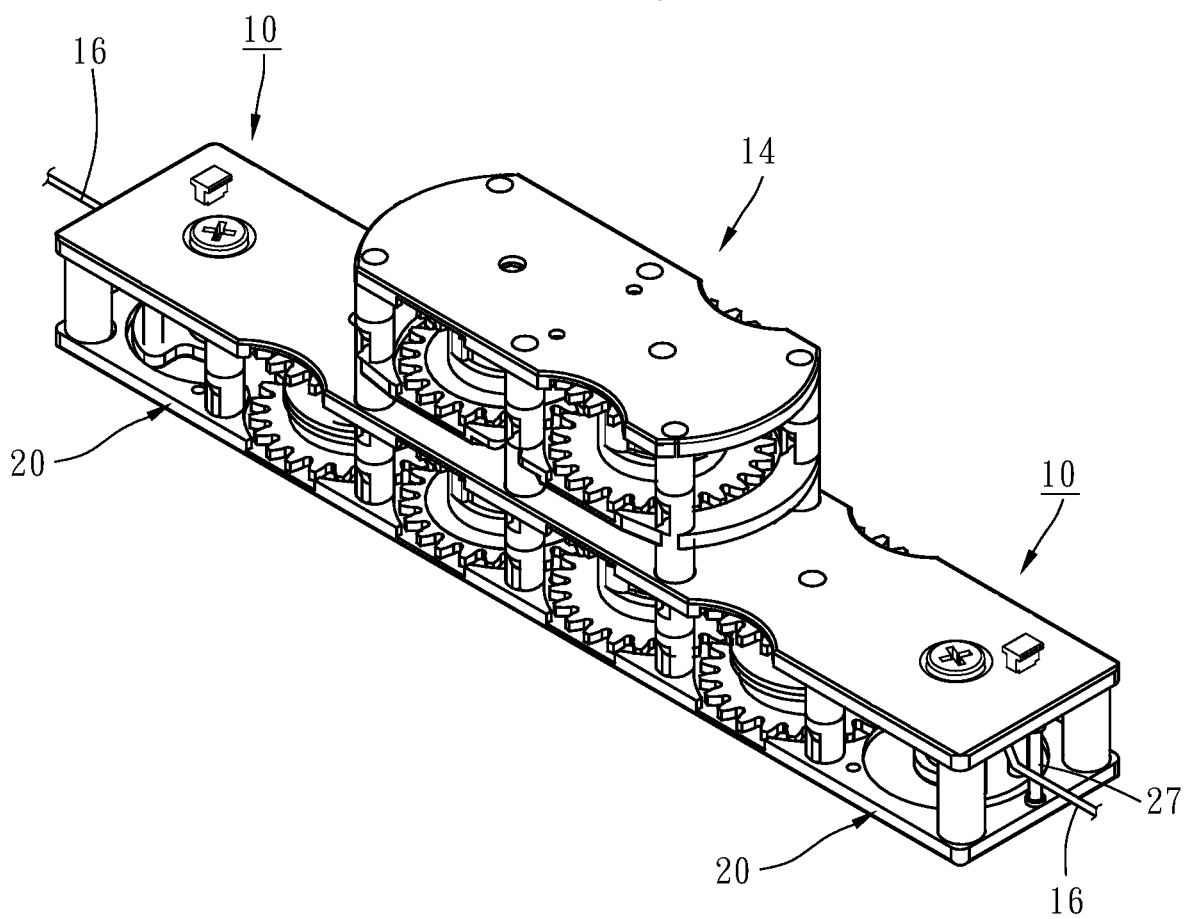
FIG. 6 is an assembled perspective view of the resistance adjusting device according to the first preferred embodiment of the present invention and a dual-torsion-spring cord rolling device used with it.

In practical usage, different types of cord rolling devices can use different amounts of the resistance adjusting device 10 of the invention. For example, for the single-torsion-spring cord rolling device 12 as shown in FIG. 5, because there is only one lift transmission cord 16, there may be only one resistance adjusting device 10 of the invention disposed in the cord rolling device 12. For the dual-torsion-spring cord rolling device 14 as shown in FIG. 6, because there are two lift transmission cords 16 at the left and right sides, there should be two resistance adjusting devices 10 of the invention disposed in the cord rolling device 14. However, no matter used with which type of cord rolling device 12 or 14, the resistance adjusting device 10 of the invention is combined with the aforesaid cord rolling device 12 or 14 by the base 20, and the lift transmission cord 16 is wound around the guiding wheel 29 and the second tension guiding rod 27 and then extended out of the base 20, as shown in FIGS. 2 and 7.

Figure 8:
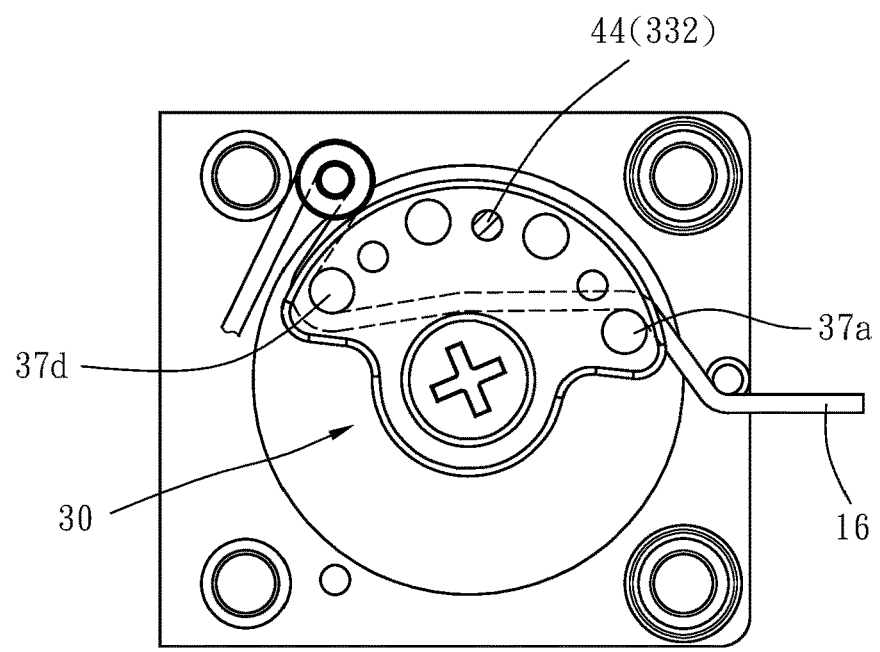
Figure 9:
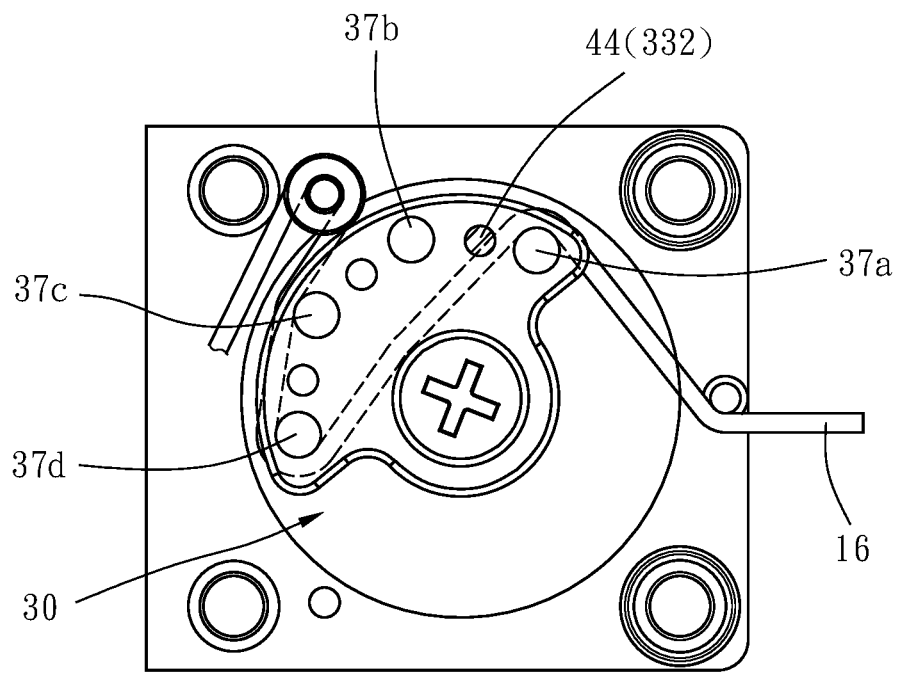

For the adjustment of the friction resistance between the lift transmission cord 16 and the resistance adjusting seat 30, the operating portion 42 of the positioning pin 40 is firstly used to let the positioning pin 40 pulled up as shown in FIG. 4, so that the positioning pin 40 is removed. After that, the manual tool such as the cross-shaped screwdriver can be engaged with the driving groove 336 of the resistance adjusting seat 30 to rotate the resistance adjusting seat 30. During the rotation of the resistance adjusting seat 30, the cord arrangement of the lift transmission cord 16 can be changed by one or a plurality of the resistance adjusting rods 37a-37d, so that the friction resistance between the lift transmission cord 16 and the resistance adjusting seat 30 can be adjusted. For example, when the resistance adjusting seat 30 is located at a first state as shown in FIG. 7, the resistance adjusting seat 30 is abutted against the lift transmission cord 16 by the leftest resistance adjusting rod 37d and the second resistance adjusting rod 37b from the right side. When the resistance adjusting seat 30 is rotated to a second state as shown in FIG. 8, the resistance adjusting seat 30 presses the lift transmission cord 16 by the leftest resistance adjusting rod 37d and pushes the lift transmission cord 16 by the rightest resistance adjusting rod 37a. When the resistance adjusting seat 30 is further rotated to a third state as shown in FIG. 9, the resistance adjusting seat 30 presses the lift transmission cord 16 by the left two resistance adjusting rods 37c-37d and pushes the lift transmission cord 16 by the rightest resistance adjusting rod 37a. After the adjustment is finished, as long as the positioning portion 44 of the positioning pin 40 is inserted in the pin hole 232 of the base 20 and the associated positioning hole 332 as shown in FIG. 3, the resistance adjusting seat 30 is disabled from rotating, thereby positioned.

Figure 10:
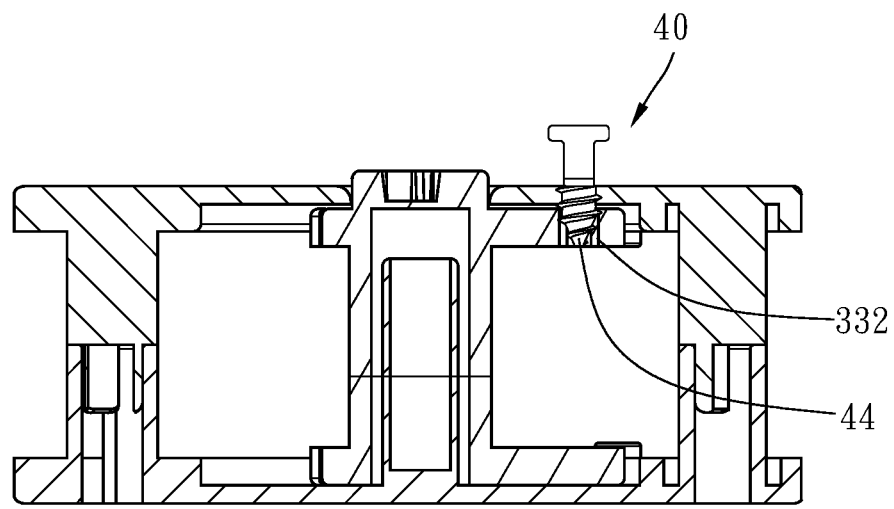
FIG. 10 is a sectional view of a resistance adjusting device according to a second preferred embodiment of the present invention.

On the other hand, for further increasing the positioning effect of the positioning pin 40, as shown in FIG. 10, the positioning portion 44 of the positioning pin 40 may be screwed in the positioning hole 332. That means, the positioning portion 44 is provided on the external surface thereof with external thread, and each positioning hole 332 is provided on the inner wall thereof with internal thread. By the matching of the internal and external threads, the positioning portion 44 of the positioning pin 40 can be fixed to the positioning hole 332 more positively, so that the positioning pin 40 is prevented from being loosed by an unexpected external force.

In conclusion, the resistance adjusting device 10 of the invention can be used to adjust the friction resistance between the lift transmission cord 16 and the resistance adjusting seat 30 as long as the positioning pin 40 is removed. The whole adjustment process needs no structural disassembly and assembly, thereby increasing the usage convenience and maintaining good assembly accuracy.

What is claimed is:

1. A resistance adjusting device for a non-pull cord window blind, the resistance adjusting device comprising:

a base having a top hole, a pin hole located adjacent to the top hole, and a fixed shaft correspondingly located under the top hole, each of the top hole, the pin hole and the fixed shaft having circular cross-sections;

a resistance adjusting seat having a rotational shaft and a driving portion having an X shaped driving groove, the rotational shaft having an axial hole, the resistance adjusting seat being rotatably sleeved onto the fixed shaft of the base by the axial hole of the rotational shaft, the driving portion being disposed on a top end of the rotational shaft and accommodated in the top hole of the base, the resistance adjusting seat further having a plurality of positioning holes and a plurality of resistance adjusting rods, the plurality of positioning holes and the plurality of resistance adjusting rods being arranged with spaces therebetween and the plurality of positioning holes and the plurality of resistance adjusting rods being arranged in an arched or curved configuration with a center of the arched or curved configuration coinciding with a enter of the axial hole of the rotational shaft; and a positioning pin detachably disposed in the pin hole of the base and selectively disposed in one of the positioning holes of the resistance adjusting seat.

2. The resistance adjusting device as claimed in claim 1, wherein the resistance adjusting seat has a top flank plate and a bottom flank plate; the top flank plate has the positioning holes and the driving portion; the rotational shaft and the resistance adjusting rods are connected between the top and bottom flank plates.

3. The resistance adjusting device as claimed in claim 2, wherein the base has a top accommodating recess and a bottom accommodating recess; the top and bottom flank plates of the resistance adjusting seat are rotatably accommodated in the top and bottom accommodating recesses.

4. The resistance adjusting device as claimed in claim 1, wherein the base is provided at two opposite ends thereof with a first tension guiding rod and a second tension guiding rod respectively; the base further has a guiding wheel disposed on the first tension guiding rod.

5. The resistance adjusting device as claimed in claim 1, wherein the positioning pin has an operating portion and a positioning portion connected with the operating portion; when the positioning portion is inserted in one of the positioning holes through the pin hole, the operating portion is protruded from the top surface of the base.

6. The resistance adjusting device as claimed in claim 5, wherein the positioning portion of the positioning pin is screwed in one of the positioning holes.

7. The resistance adjusting device as claimed in claim 1, wherein the positioning holes and the resistance adjusting rods are arranged in a staggered manner.

\* \* \* \* \*